Oct. 24, 1933.   J. B. POL   1,932,086

TRANSPORT FOR LAWN MOWERS

Filed Aug. 28, 1929

Inventor

John B. Pol

By Bottum Hudnall Lecher
McNamara & Michael
Attorney

Patented Oct. 24, 1933

1,932,086

UNITED STATES PATENT OFFICE 1,932,086

TRANSPORT FOR LAWN MOWERS

John Baptiste Pol, Racine, Wis., assignor to Jacobsen Manufacturing Company, Racine, Wis., a corporation of Wisconsin Application August 28, 1929. Serial No. 388,885

7 Claims. (Cl. 180—16)

This invention relates to transports for lawn mowers and more particularly to transports for lawn mowers which have an engine or source of power thereon for driving or actuating the mower.

Power mowers, especially those utilized in cutting putting greens must be transported over considerable distances in carrying out their regular schedule of cutting operation. Thus, the mower used for cutting putting greens must travel from green to green over the more or less uneven and sometimes rough fairway. This throws considerable wear and tear on the various mechanisms of the mower and tends to lessen its effectiveness and to shorten its life and in some instances results in damage or breakage of its parts.

One of the principal objects of the present invention is to provide transports for mowers which support and carry mowers from one point of use to another in such manner as to relieve them of unnecessary wear and tear and to protect them from damaging objects, shocks or strains.

A further object is to provide transports which are adapted to be driven by engines or other sources of motive power on mowers.

A power driven mower is usually provided with traction drums or wheels for driving it and the present invention contemplates the use of such means for moving the transport when the mower is placed upon it.

Other objects and advantages reside in certain novel features of the construction, arrangement and combination of parts, which will be hereinafter more fully described and particularly pointed out in the appended claims, reference being had to the accompanying drawing forming a part of this specification, and in which:

Figure 1:
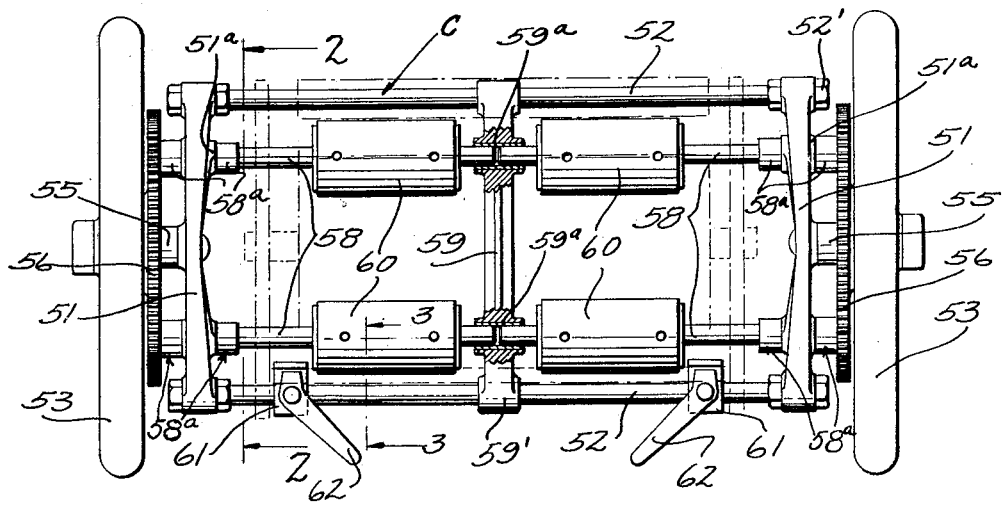
Figure 1 is a plan view of one form of transport, some of the parts being shown in cross section, with a diagrammatic dotted line showing of the traction drum of a power driven lawn mower thereon.

Referring to the drawing it will be seen that the transport comprises generally a cradle designated generally at C and rotatably mounted upon ground wheels 53 which preferably are provided with rubber tires to minimize the transmission of shocks to the motor and also to prevent injury to a fairway or lawn over which the transport may be rolled. The cradle C comprises triangular shaped end pieces or side frames 51, and intermediate frame piece 59 and cross rods 52 extending transversely between and connecting the side frame members 51 and intermediate piece 59. Nuts 52' fasten the rods 52 to the side frames 51 while the intermediate frame piece 59 has sleeve-like bearings 59' at its ends in which the rods 52 are received and if desired suitably secured. The upper ends of the triangular shaped end pieces or side frames 51 are provided with bearings in which the inner ends of axles 55 are fitted and suitably held against displacement, the axles 55 also being fitted and suitably held in the hubs of the wheels 53 whereby the wheels 53 though supporting the cradle are freely rotatable.

Figure 2:
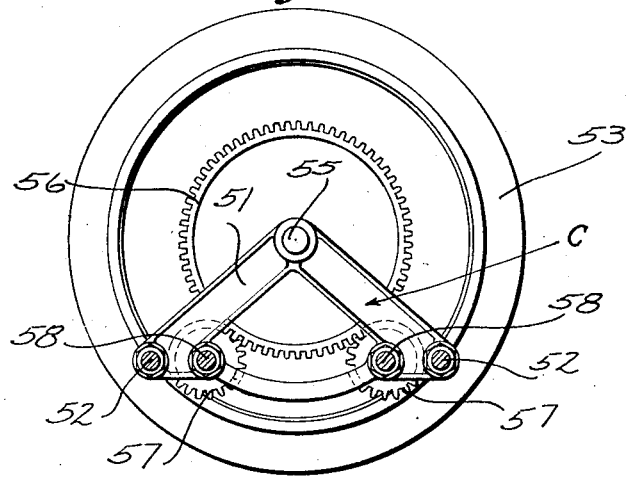
Figure 2 is a transverse cross sectional view taken on the line 2—2 of Figure 1.

Means is provided on the cradle C for supporting a power driven lawn mower and for taking the drive from the lawn mower and transmitting it to the wheels 53 so that the power of the mower is utilized to drive the transport. In the present form of the invention this means includes four transversely extending shafts 58, the shafts 58 being grouped in pairs with the members of each pair axially aligned and with one pair disposed in parallelism to the other as clearly shown in Figure 1. Each shaft 58 is rotatably supported in a bearing 51ᵃ provided therefor in its end piece or frame member 51 and is also supported in a portion of a bearing 59ᵃ provided therefor on the intermediate frame piece 59. For preventing endwise displacement of the shaft 58 any suitable means may be employed, such for instance, as set collars 58ᵃ suitably secured to each shaft 58 and engaging the opposite sides of the associated bearing 51ᵃ. On each shaft 58 a friction driving roller 60 is fixed, these rollers being so mounted on their respective shafts that the rollers of the members of one pair of shafts 58 are opposite the rollers of the members of the other pair of shafts. Moreover, as will be understood from the comparison of Figures 1 and 2, the rollers 60 are symmetrically disposed with respect to the axles 55, that is, with respect to the point of suspension of the cradle.

In use, the traction drums of the mower are supported by the rollers 60 and the symmetrical disposition of these rollers makes them well adapted to support certain types of power mowers now in use especially where the center of gravity of the mower is approximately at the center of the traction drum or drums thereof. The rollers 60 are utilized not only to support the mower but to take the drive from the traction drums thereof and in order to transmit the drive so taken to the wheels 53, the ends of the shafts 58 have pinions 57 fixed thereto and meshing driven gear wheels 56 secured to the wheels 53.

Figure 3:
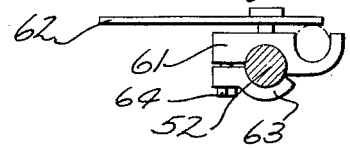
Figure 3 is a detail view of a clamping device used on the transport.

One of the rods 52 carries means for securing the lawn mower after it is in proper position on the cradle so that when the traction drum of the mower engages the rollers 60, the proper frictional engagement is maintained. This means preferably consists of a pair of latches or holders, one of which is shown in detail in Figure 3 and consists of hook-shaped members 61 and a retaining lever 62 pivoted thereon. This latch is held in fixed position on the rod 52 by any suitable means, as for example by a clamp 63 and bolt 64. When properly positioned the latches are adapted to engage and hold a transverse rod of the mower in the position shown in dotted lines in Figures 1 and 3.

In loading a mower on this transport, the operator places his foot against the rear rod 52 and tilts the cradle until the forward end is sufficiently lowered to permit the mower to be backed thereon. The pivoted levers 62 are then moved to the position shown in Figures 1 and 3 to hold the mower in place.

In traveling from place to place the operator uses the handles of the mower for steadying the cradle of the transport and for guiding the transport. Ordinarily a power motor has two traction drums mounted to rotate about a common axis, but differentially driven from the power plant of the mower. Applicant's transport is so designed that one of these drums engages the rollers 60 at one side and the other engages the rollers 60 at the opposite side. As the rollers 60 on one side of the transport are mounted on shafts rotatable independently from the shafts carrying the rollers on the opposite side, the differential drive of the mower is continued through the transport so that the transport may be easily turned or steered. Very slight effort is required of the operator when the mower is being transported from place to place since the power drive of the mower is used for propelling the transport and since the weight of the mower is symmetrically supported on the ground wheels.

The invention claimed is:

1. A transport for a power driven lawn mower comprising a pair of ground wheels, a cradle pivotally supported on said ground wheels and tiltable with respect thereto to facilitate the loading of the mower onto said cradle, said cradle having mower engaging and supporting elements positioned on the opposite sides of the points of suspension of the cradle whereby to provide for the balanced support of said mower, at least certain of said mower engaging and supporting elements being engaged by the traction drum of the mower and having driving connection with the ground wheels whereby the power of the motor may be utilized to propel the transport.

2. A transport for a power driven lawn mower comprising a cradle consisting of end pieces having axles on their upper portions and bars for securing corresponding lower portions of the end pieces together, wheels rotatably mounted on the axles and driving means for the wheels, said driving means consisting of gears secured to the wheels, pinions for driving the gears, shafts mounted on the cradle for driving the pinions and frictional rollers secured to the shafts and adapted to be actuated by power driven elements of said mower.

3. A transport for power driven lawn mowers comprising ground wheels, a cradle supported on said ground wheels, combined supporting and driving rollers rotatably mounted on the cradle and symmetrically disposed with respect to the points of suspension of the cradle on the ground wheel, said rollers being adapted to take the drive from the traction drums of the power mower as well as to engage said drums for supporting the mower and gearing actuated by the rollers and connected to the ground wheels for driving the same.

4. A transport for a power driven lawn mower comprising a cradle consisting of end pieces having axles on their upper portions and bars for securing corresponding lower portions of the end pieces together, wheels rotatably mounted on the axles and driving means for the wheels, said driving means consisting of gears secured to the wheels, pinions for driving the gears, shafts mounted on the cradle for driving the pinions and frictional rollers secured to the shafts and adapted to be actuated by power driven elements of said mower and latches carried by one of said bars and cooperable with the mower for securing the same in proper position on the cradle.

5. A transport for a power driven lawn mower comprising a cradle consisting of end pieces having axles on their upper portions and bars for securing corresponding lower portions of the end pieces together, wheels rotatably mounted on the axles and driving means for the wheels, said driving means consisting of gears secured to the wheels, pinions for driving the gears, a shaft mounted on the cradle for driving the pinions and means secured to the shaft and adapted to be actuated by a power driven element of said mower.

6. A transport for a power driven lawn mower comprising a cradle consisting of end pieces having axles on their upper portions, and bars for securing corresponding lower portions of the end pieces together, wheels rotatably mounted on the axles and driving means for the wheels, said driving means consisting of gears secured to the wheels, pinions rotatably mounted on the cradle and meshed with the gears for driving the same, and means connected to said pinions and adapted to be actuated by a power driven element of the mower.

7. A transport for a power driven lawn mower comprising ground wheels, a cradle pivotally supported on said ground wheels and having transversely extending portions disposed on the opposite sides of the pivotal connections between the cradle and the ground wheels whereby the cradle affords an easily balanced support for a lawn mower and yet may be tilted to facilitate loading, a power take-off mounted on the cradle and adapted to be actuated by a power driven element of said mower, and motion transmission means between said power take-off and said wheels.

JOHN BAPTISTE POL.